(12) United States Patent
DeFreitas

(10) Patent No.: US 7,458,799 B2
(45) Date of Patent: Dec. 2, 2008

(54) TAPERED HOLLOW POLE EXTRUDER

(76) Inventor: Glen DeFreitas, 4-14191 Burrows Road, Richmond, British Columbia (CA) V6V 1K9

( * ) Notice: Subject to any disclaimer, the term of this patent is extended or adjusted under 35 U.S.C. 154(b) by 322 days.

(21) Appl. No.: 11/346,323

(22) Filed: Feb. 3, 2006

(65) Prior Publication Data
US 2007/0184147 A1 Aug. 9, 2007

(51) Int. Cl.
*B29C 47/22* (2006.01)
(52) U.S. Cl. .................. 425/381; 425/327; 425/465; 425/466
(58) Field of Classification Search ............. 425/327, 425/381, 465, 466
See application file for complete search history.

(56) References Cited
U.S. PATENT DOCUMENTS

| | | | | |
|---|---|---|---|---|
| 1,440,007 A | * | 12/1922 | Freeman et al. | 425/329 |
| 2,780,835 A | * | 2/1957 | Sherman | 425/381 |
| 2,966,934 A | * | 1/1961 | Huet | 72/386 |
| 3,178,770 A | * | 4/1965 | Willis | 425/76 |
| 3,480,999 A | * | 12/1969 | Carlo | 425/381 |
| 3,932,090 A | * | 1/1976 | Brumlik | 425/381 |
| 5,989,466 A | * | 11/1999 | Kato et al. | 264/40.5 |
| 2003/0206990 A1 | * | 11/2003 | Edmondson et al. | 425/466 |

* cited by examiner

*Primary Examiner*—Robert B. Davis
*Assistant Examiner*—Joseph Leyson
(74) *Attorney, Agent, or Firm*—Smiths IP; Lawrence Chan

(57) ABSTRACT

An extrusion mold head is provided having outer mold tapered cams that form an automatically contracting or expanding mold surface during extrusion of the poles, allowing the formation of tapered outer diameter on each pole. The extrusion mold head also has an inner mold tapered mandrel that is advanced or withdrawn in concert with the movement of the outer mold head pieces. The inner mold surface thereby automatically contracts or expands as required during extrusion of the poles to form either a uniform thickness or a tapering thickness of the wall of each pole.

24 Claims, 18 Drawing Sheets

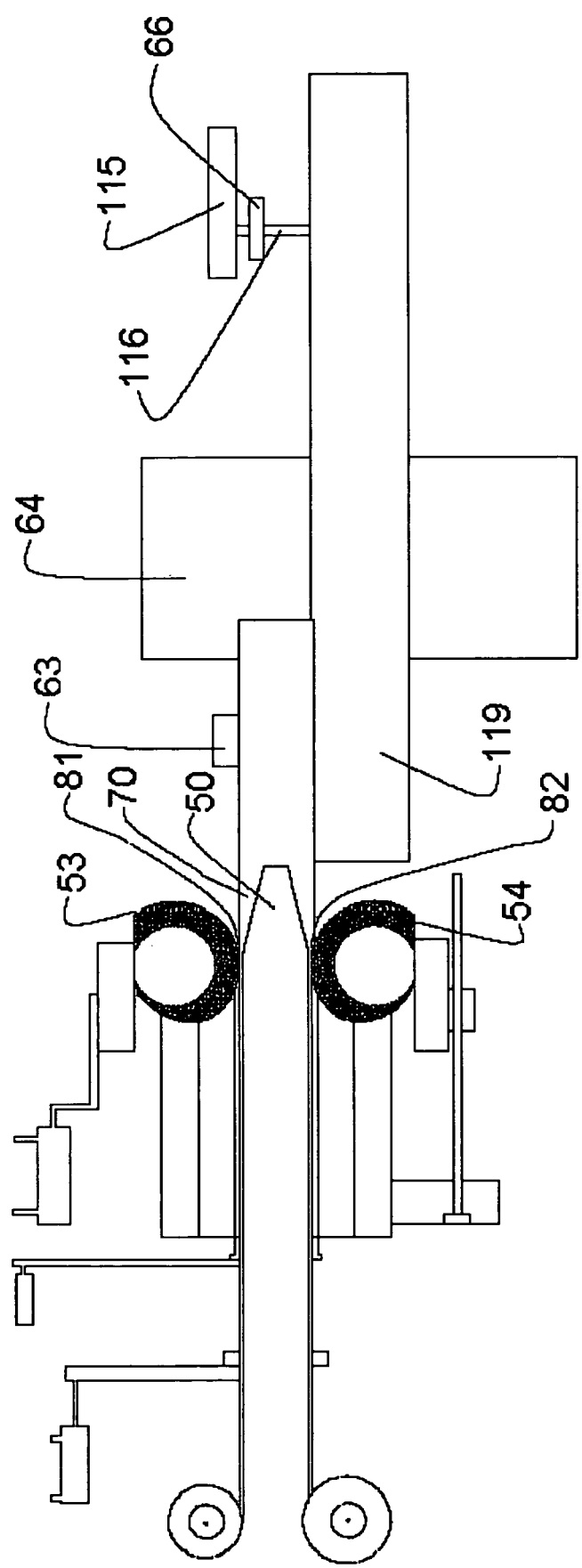

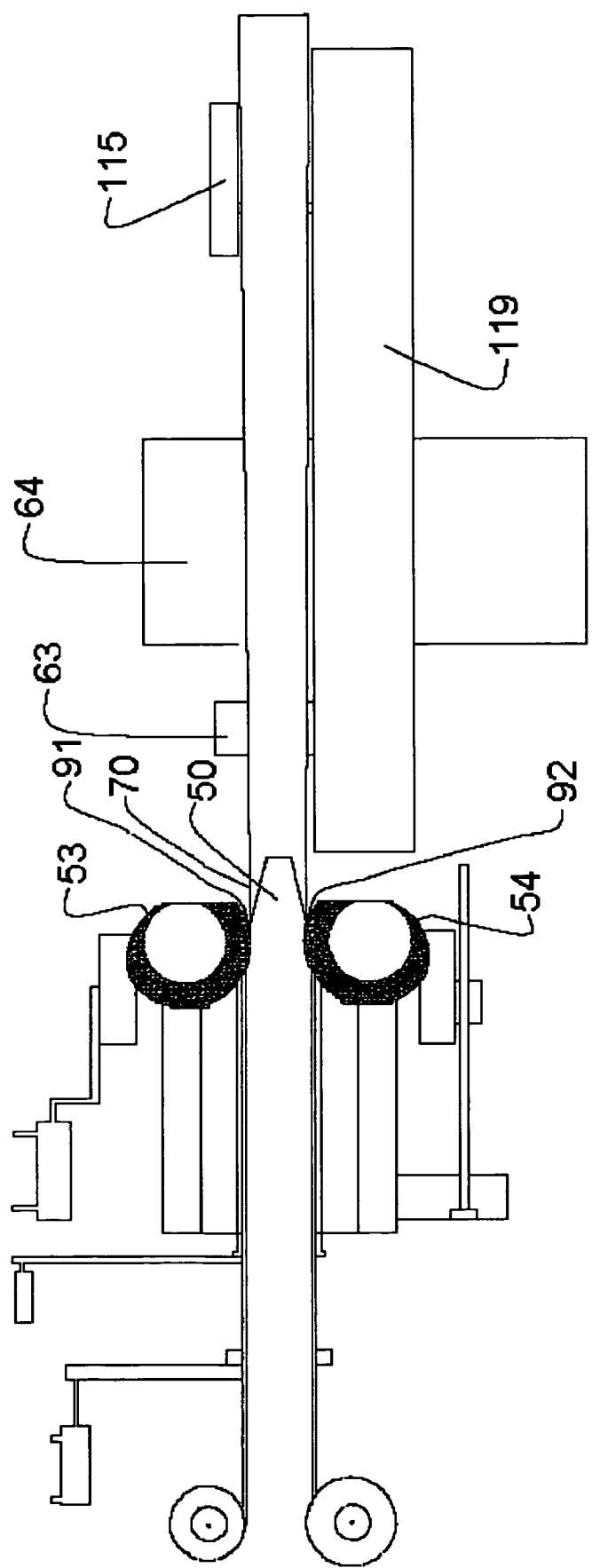

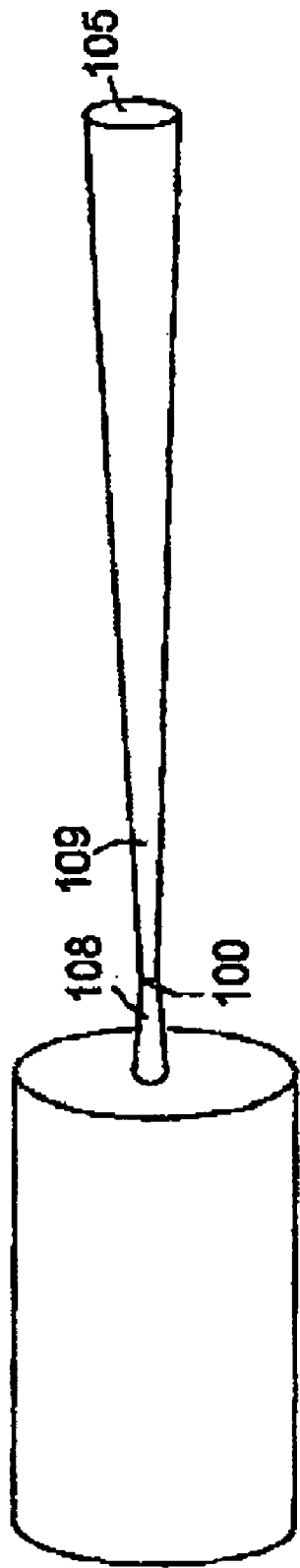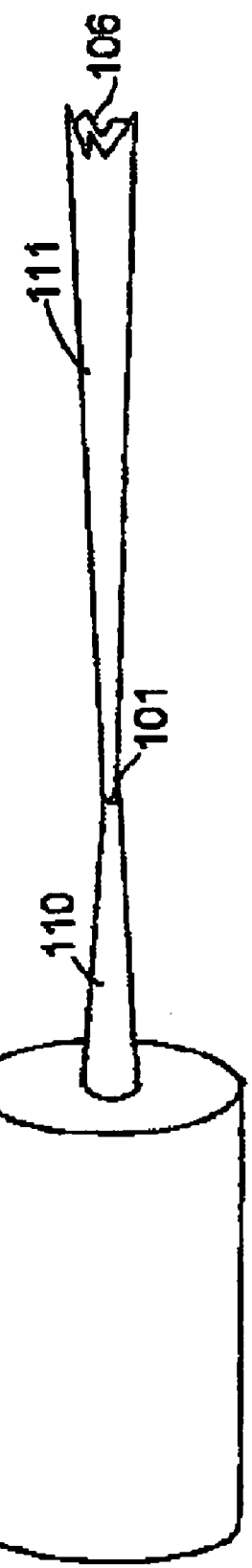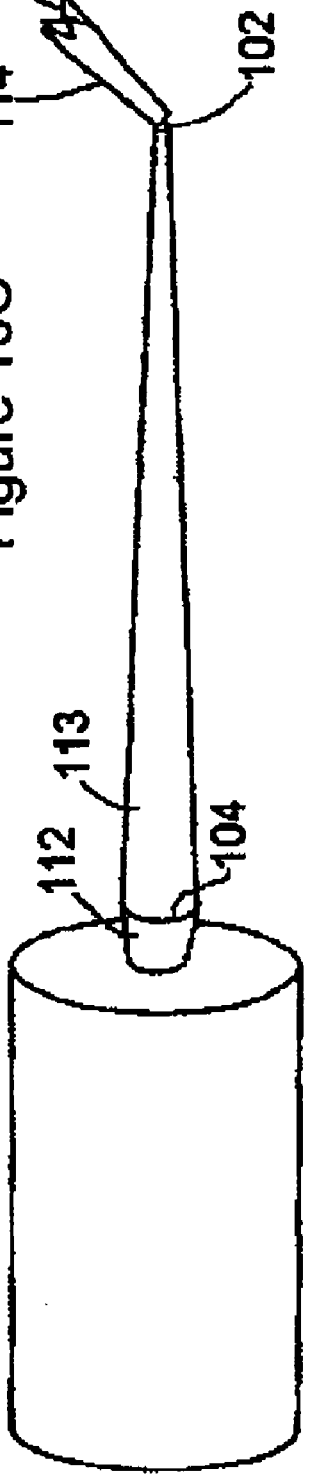

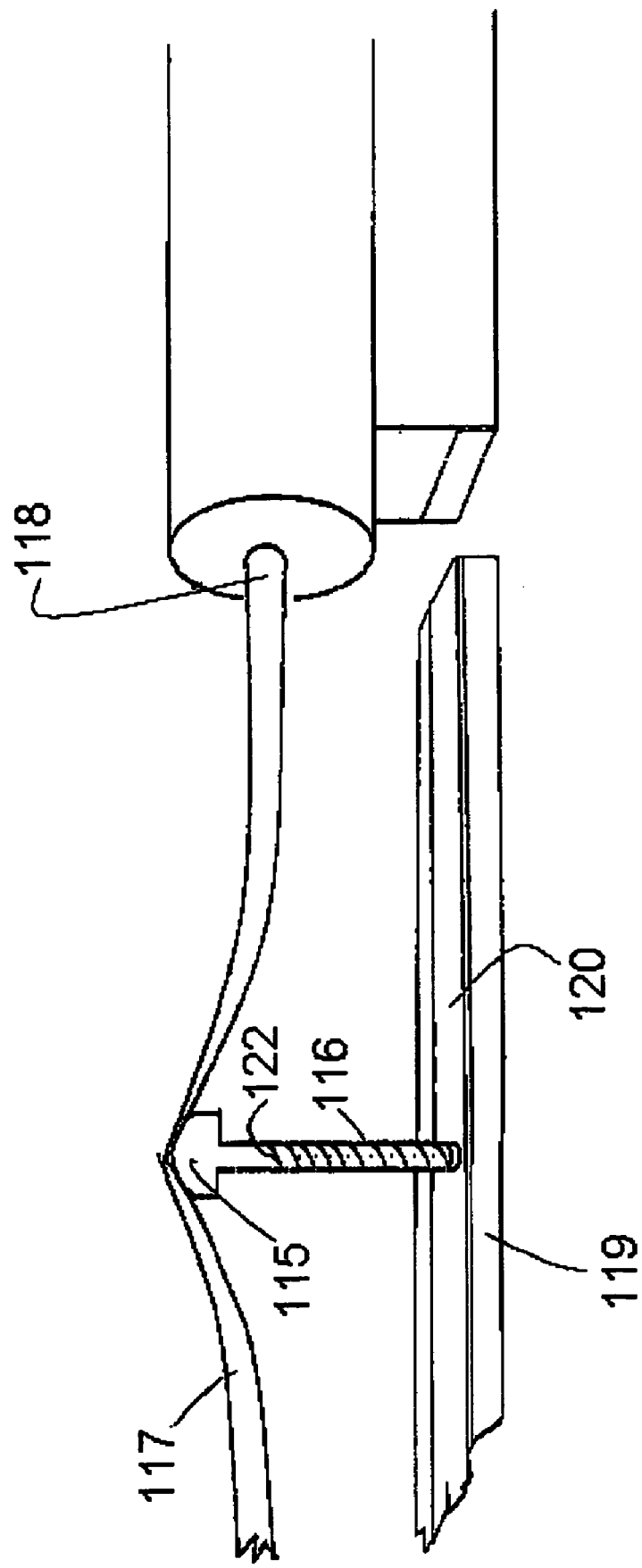

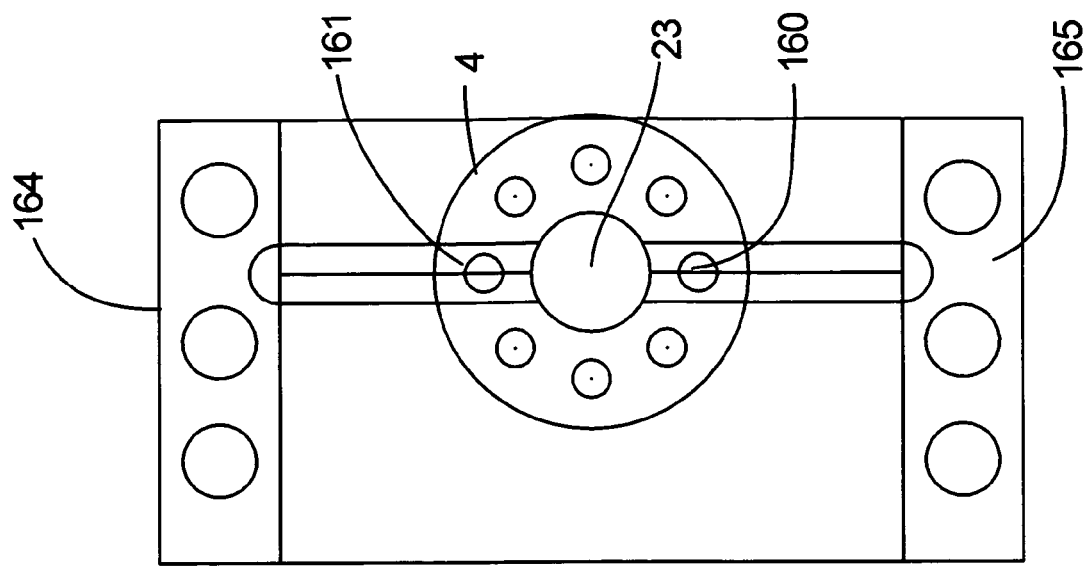
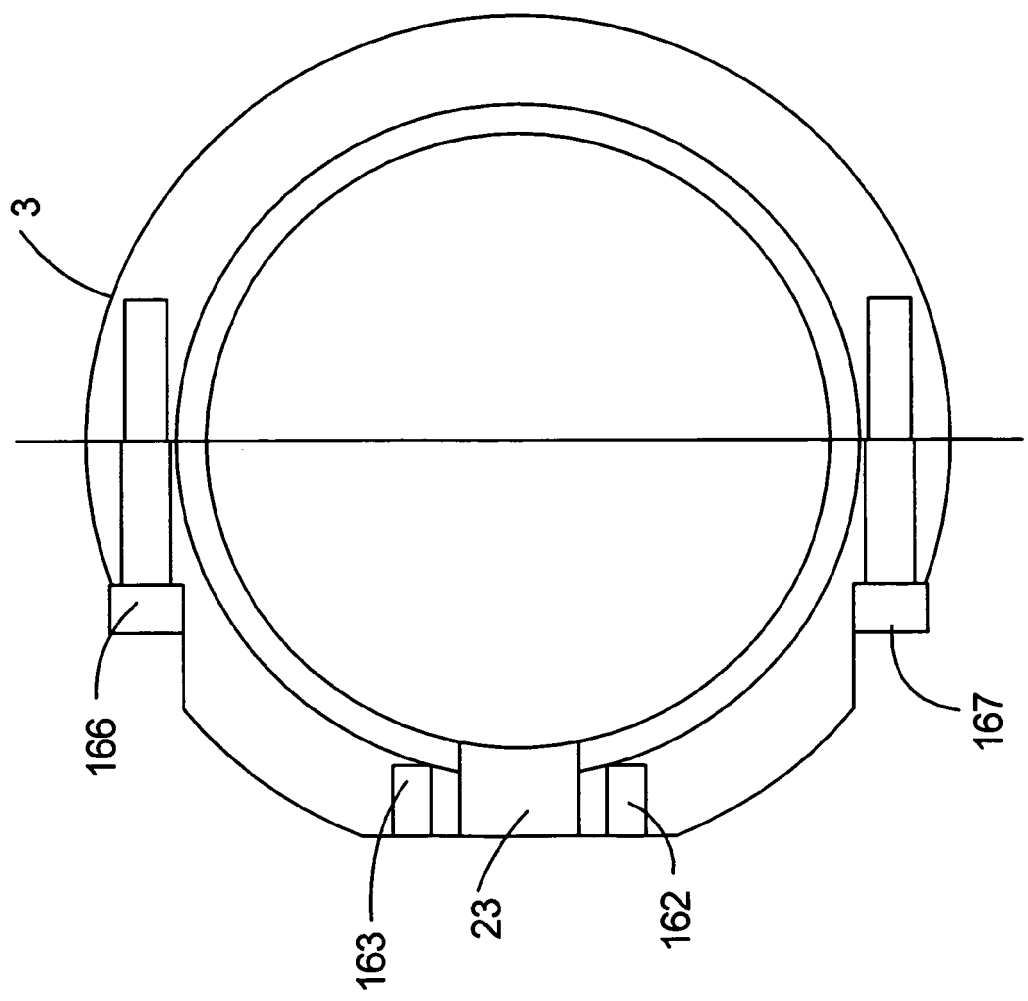
Figure 16

TAPERED HOLLOW POLE EXTRUDER

FIELD OF THE INVENTION

This invention relates to extrusion molding processes and apparatus. Extrusion molding allows the formation of a product by gradual or continuous removal of the product from a mold opening.

BACKGROUND OF THE INVENTION

It is common to make products having a uniform cross-section by extrusion from an aperture through which the raw material of the product is squeezed. In the case of plastic products, typically the plastic material is heated and forced under pressure to proceed through a shaping chamber, or mold portion, having an aperture through which the product is extruded. The plastic solidifies during or after its extrusion from the mold. It is then cooled and can be further processed by machining or cutting into required lengths.

There are many products that are elongated and would be suitable for formation by extrusion molding. However the extrusion is more difficult where a tapered product is planned, such as a fishing rod, a street lamp pole, a construction piling, or an antennae. The taper can be desired merely to save material near the top, where less structural strength is required, such as a street lamp pole, or the taper can planned for enhanced functionality, such as with a fishing pole, where initial flexibility near the tip is desirable, with increasing rigidity toward the base of the pole.

If the product to be formed is to be solid rather than hollow, it is possible to form it with extrusion by having an adjustable aperture such as an iris of overlapping blades that gradually close. However such apertures have been problematic for extrusion molding with plastic that is under pressure. The pressure can cause the plastic to enter between and jam or distort the seams between the jaws or among the iris blades.

There are additional problems if a hollow extruded product is desired. Having a complementary spindle or die set in the middle of an aperture in the mold in order to attempt hollowed extrusion is vulnerable to pressure because the spindle or die is difficult to support in the correct position. It cannot be supported right at the aperture without breaking the intended hollow. And it could not be made adjustable by having a fanning set of overlapping blades complementary to an outer iris's mechanism, because that would be even more subject to jamming or distorting failure than an outer iris. An outer iris' components could at least be supported from their immediate periphery, but having an inner die with fanning blades adjustable at ninety degrees to the extrusion flow could not be supported directly at the aperture without breaking the intended hollow in the formation of the product. A combination of extrusion and blow molding is suitable for short hollow objects where wall thickness tolerances fit within the blow deformation, expansion, compression, and strength parameters of the extruded material, but blow molding is not suitable for very elongated products such as street lamp poles. The temperature differential from one end of the product to the other during such a blow process typically overlaps the set temperature within a few feet, and extended control of the shape is only possible in any event for such elongated structures by having a post-extrusion outer (and inner if applicable) mold to control the blow, in which case the special problems of poured material molds arise again.

Clamping outside of and adjacent to an extrusion aperture can be used for shaping before a product is cooled. This method is used, for example, in producing corrugated tubing. However the method is a complication requiring both extra parts, energy and time. The shaping occurs outside the extrusion mold itself, necessitating a greater initial plastics temperature to allow pliability outside the mold itself. The process typically slows down what would otherwise be the maximum rate of extrusion for the material and product desired. Moreover, such post-mold processing is ill-suited to shaping the inside of the extruded product, as it is the outside of the extruded product that presents itself upon exit from the mold.

Elongated corrugated tube can be made in a traveling mold tunnel equipped with variegated shaped mold blocks. The seams between the mold blocks typically coincide with changes in the diameter of the tubing that forms the corrugations. The method is less suited where a smooth walled tube is desired, and is problematic where varying taper, whether external taper, internal taper, or both, is involved. A smooth wall, particularly on the outside is often desired in order to present a clean appearance, with a lack of irregularities that can become depositories for grime or dirt. Seams between rough patches on a wall can become cracks or shear lines that affect the rigidity and tensile strength of the product. Generally traveling mold tunnels have found to be unsuitable for producing smooth walled tubing due to the difficulties in controlling shear between an inner forming mandrel and an outer mold tunnel, quite apart from the additional difficulties of forming taper whether outer dimensional or relating to wall thickness.

It was common in the past for street lamp poles and telephone poles to be made from tree trunks. However even if the wood is pressure-treated with preservatives, the poles deteriorate in the ground, at their bases, and wherever exposed to the weather. Moreover such poles are not hollow, unless special work has been done on them, requiring external wiring. Even when new, treated wooden poles are often considered to be unsightly compared to uniform manufactured poles. Metal street lamp poles have been molded by pouring molten metal into static molds for hundreds of years. More recently, plastics technology has allowed the manufacture and use of high density, high strength polyethylene street poles, which are sufficiently strong to perform instead of wooden or metal poles and are less subject to rot or oxidization in the weather and in the ground. The problems for metal and wood poles can be even more severe in the case where they are used underwater, such as for pier pilings. High density polyethylene extrudable material has been found to be of sufficient compressive and tensile strength to replace wooden or metal poles in many such applications.

In the case of large, long poles such as street lamp poles, large amounts of material can be saved by having the poles tapered as well as hollow. The tapering is ideally not only an external taper but also an internal taper whereby the wall thickness is greater at the bottom of the pole and lesser near the top. The hollow is also functional for allowing wiring to be inserted up the pole.

If the poles, whether metal or plastic, are formed by pouring into a static mold in accordance with the prior technology, the mold needs to be unduly long and unwieldy to operate. Industrial floor space is wasted in keeping and using such molds, and energy is wasted in opening and closing such enormous molds. It is possible to reduce mold space by having a tunnel mold for forming long pipes, but such molds have not been suited for the manufacture of tapered poles.

SUMMARY OF THE INVENTION

This invention provides an apparatus and method for forming tapered hollow poles by continuous extrusion of a plastic material. An extrusion mold head is provided having outer mold tapered cam-shaped coordinated arms that form an automatically contracting or expanding mold surface during extrusion of the poles, allowing the formation of tapered outer diameter on each pole. The extrusion mold head also has an inner mold tapered mandrel that is advanced or withdrawn in concert with the position of the outer mold head pieces. The inner mold surface thereby automatically contracts or expands as required during extrusion of the poles to form either a uniform thickness or a tapering thickness of the wall of each pole. The movement of the outer mold cams and of the inner mold tapered mandrel can be mechanically connected to the feeding of the extruded material. The movement can be set to cycle from fully open to fully narrowed to fully open, allowing the formation of two poles in a row, one formed from bottom to top and the next from top to bottom.

Poles of extreme length can thus be formed by extrusion in a mold that is a fixed, short length. The length of the poles can be varied, as can the rate of taper both inside and outside of the pole. Two poles can be made in one cycle, and separated by snapping or cutting after the mid-point has exited the mold. The poles can be supported by props placed adjacent to the extrusion aperture until sufficiently cool not to be deformed by gravity. In the case of very long poles being formed rapidly, it may be necessary to use water suspension and cooling to prevent unacceptable deformation of the pole. It is also possible to use rotation of the extruded pole or of the mold together with the pole to counter any propensity of the material to deform until it is set.

It is contemplated that a prime use for the mold apparatus and method would be the manufacture of street lamp poles tens of feet long and like support poles such as pier piles, telephone wire, and electrical supply wire poles. However, longer poles hundreds of feet high for hydroelectric main lines, windmills, or building construction could be made with the apparatus and method. Indeed any short tapered tube desired from extrusion material could be made with the apparatus and method, from slim fishing poles to plumbing connectors.

The invention is essentially an extrusion mold housing with a plastic material supply inlet and a mold head comprising:

a) coordinated arms that are moveable within the mold head and that define a periphery of an extrusion aperture; and b) a tapered mandrel that is moveable within the mold head and defines a blockage in a central portion of the extrusion aperture in which the periphery of the aperture varies in size depending on movement of the coordinated arms within the mold head, and the blockage of the central portion of the aperture varies in size depending on the movement of the tapered mandrel within the mold head.

The movement of the coordinated arms and the movement of the tapered mandrel are coordinated by gears to make the blockage of the central portion of the extrusion aperture increase and decrease in size in concert with a respective increase and decrease in size of the periphery of the extrusion aperture during an extrusion.

The tapered mandrel is elongated and is mounted along a longitudinal axis centered on and perpendicular to the extrusion aperture. The tapered mandrel can have a set of mandrel facets that are narrower toward a tip of the tapered mandrel.

The coordinated arms comprise a set of arm facets that are variable in their exposed width and define the periphery of the extrusion aperture during an extrusion.

The coordinated arms comprise a set of arm facets that are variable in their exposed width and define the periphery of the extrusion aperture during an extrusion. The set of arm facets matches the set of mandrel facets in number. The arm facets and the mandrel facets are parallel to each other during an extrusion. A position of the coordinated arms in relation to a position of the tapered mandrel thereby defines a distance between the corresponding arm facets and mandrel facets and controls a wall thickness for a tapered hollow pole during an extrusion.

A gradually adjustable position of the coordinated arms in relation to a gradually adjustable position of the tapered mandrel defines a variable distance between corresponding arm facets and mandrel facets and enables a wall thickness that is thinner at a top portion and thicker at a base portion of a tapered hollow pole during an extrusion.

In a preferred embodiment, the coordinated arms are a set of partially rotatable tapered cams, each mounted on a cam axle and cam frame attached to the mold head and have a series of cam grooves that mesh with a corresponding cam gear in a coordinated arm movement control to enable gear-driven adjustment of the size of the periphery of the extrusion aperture. Each cam gear is rotatably mounted in the mold housing to mesh with a reduction gear mounted on a gear axle and frame. The reduction gear is driven by a reduction gear electric motor.

The reduction gear electric motor can be computer controlled to provide a gradual re-sizing of the periphery of the extrusion aperture during extrusion in keeping with design parameters for a tapered hollow pole.

The rear portion of the mandrel is mounted on slide rods attached longitudinal to the mold housing to enable the mandrel to be moved longitudinally within the mold housing. Screw bolts are threaded through a base flange on the tapered mandrel and are driven by a screw gear to adjust advancement of the tapered mandrel and the degree to which the mandrel partially blocks a central portion of the extrusion aperture during an extrusion. The screw gear is driven by a screw gear electric motor.

The screw gear electric motor can also be computer controlled to provide a gradual advancement of the tapered mandrel and the degree to which the tapered mandrel partially blocks a central portion of the extrusion aperture during an extrusion in keeping with design parameters for a tapered hollow pole.

The computer modules control a changing position of the coordinated arms and a changing position of the tapered mandrel during an extrusion to provide for an outer overall taper of a pole and an inner taper of wall thickness for the extruded pole. The coordinated arm control gear and a mandrel control gear are preferably thus interconnected and are simultaneously adjustable to provide for a selectable varying wall thickness of a tapered hollow pole during extrusion.

The mandrel positioning gears advance the tapered mandrel simultaneously with coordinated arm positioning gears widening the extrusion aperture during an extrusion of a tapered hollow pole from tip to base, and a reverse motion of the mandrel positioning gears simultaneous with a reverse motion of the coordinated arm positioning gears provides for a reciprocal extrusion of a tapered hollow pole from base to tip. A series of poles can thus be extruded without resetting the position of the coordinated arms and the tapered mandrel before each pole's extrusion.

A pole bender can be added to the system to apply lateral pressure to an extruded portion of a pole as it cools, in order to make bent poles such as street lamp poles for downward facing lamps.

A good arrangement of the outer mold coordinated arms is to have six tapered cams machined to abut each other, forming a hexagonal perimeter for the outside of the extrusion aperture. The cams individually rotate on axles, reducing or enlarging the hexagonal perimeter. The taper on each individual cam allows them to continue to abut one another, despite the reduction or enlargement by the rotational position of each cam.

The inner tapered mandrel of the mold head is advanced or withdrawn within the extrusion aperture formed by the outer mold tapered cams to provide for either a constant distance or a gradually narrowing distance between the cams and the mandrel. A good embodiment for the tapered mandrel is likewise to have it six-sided, to match the hexagonal perimeter formed by the outer mold tapered cams. The wall of the extruded hollow tapered pole can thereby be formed with a constant wall thickness, or with a lessening wall thickness. When the next pole is ready to be formed, the apparatus cycles such that the lessening wall thickness becomes an increasing wall thickness in the case of an inner as well as an outer taper. The poles thus are extruded alternately from top to bottom and then from bottom to top. The machine could be reset between poles to make them all come out the same way, but it is more efficient to alternate. Having them alternate in this way also prepares the poles for stacking and shipment in tightly packed, symmetrical top-to-bottom and bottom-to-top arrangement.

The apparatus can be set to mechanically link the rotational advancement and retraction of the outer mold tapered cams to the advancement and withdrawal of the inner mold head tapered mandrel, and both can be linked to the feed mechanism for the extruded material from which the desired tapered pole is made.

An effective way to mechanically link the effect of the outer mold head, and of the inner mold head is to have a sleeve that moves reciprocally back and forth in line with and at a rate in accordance with the extrusion, and abuts the cams of the outer mold head.

Alternatively each of the movement of the outer mold head, the inner mold mandrel, and the extruded material can be driven by individual motors and gears, with computer control allowing the programming of the apparatus to adapt to a great variety of extrusion material, degree of inner and outer taper, and length of the final product.

The tapered mandrel is formed on the end of a central cylinder through which water is piped for cooling the inside of the extruded product. The water emerges as a flow or spray from the tip of the tapered mandrel. The inside cooling effect helps to achieve uniform cooling in conjunction with an outer spray on the surface of the extruded product, or in combination with water suspension of the extruded product. A reduced pressure (partial vacuum) containment system for the extrusion molding process including the water cooling can assist in preventing deformation of the pole before setting of the extruded material.

Plastic for the mold is introduced perpendicular to the central cylinder, where it flows under pressure around the cylinder within a sleeve. The sleeve abuts the outer mold head cams. The plastic flows heated and under pressure from its inlet between the cylinder and the sleeve to exit the extrusion mold between the outer mold head cams and the tapered mandrel, where it is then cooled inside and out.

Fiberglass or other reinforcement rods can be introduced farther back in the mold, as they are typically stiffer than the plastic. They need to be inserted far enough back that they are comfortably straight within the space between the cylinder and the sleeve where the wall of the pole or other tapered extruded product is formed.

The apparatus allows the formation of extruded street lamp poles or other electrical distribution poles that are curved near their tops by bending the topmost portion of each pole as it is extruded and before it is cooled and set.

The movement of the outer mold cams and of the inner mold tapered mandrel can be mechanically connected to the feeding of the extruded material. The movement can be set to cycle from fully open to fully narrowed to fully open, allowing the formation of two poles in a row, one formed from bottom to top and the next from top to bottom.

BRIEF DESCRIPTION OF THE DRAWINGS

FIG. 8 shows a mid-section of the tapered pole being extruded from the mold head.

FIG. 9 shows a top portion of the tapered pole being extruded from the mold head.

FIGS. 10A, 10B, and 10C shows a series of tapered poles being extruded from the mold head.

FIG. 11 shows a pair of bent-tipped tapered poles being extruded from the mold head.

FIG. 16 is front cross-sectional view of the injection barrel, with a side view of the plastic inlet port for the injection barrel.

DETAILED DESCRIPTION

Figure 1:
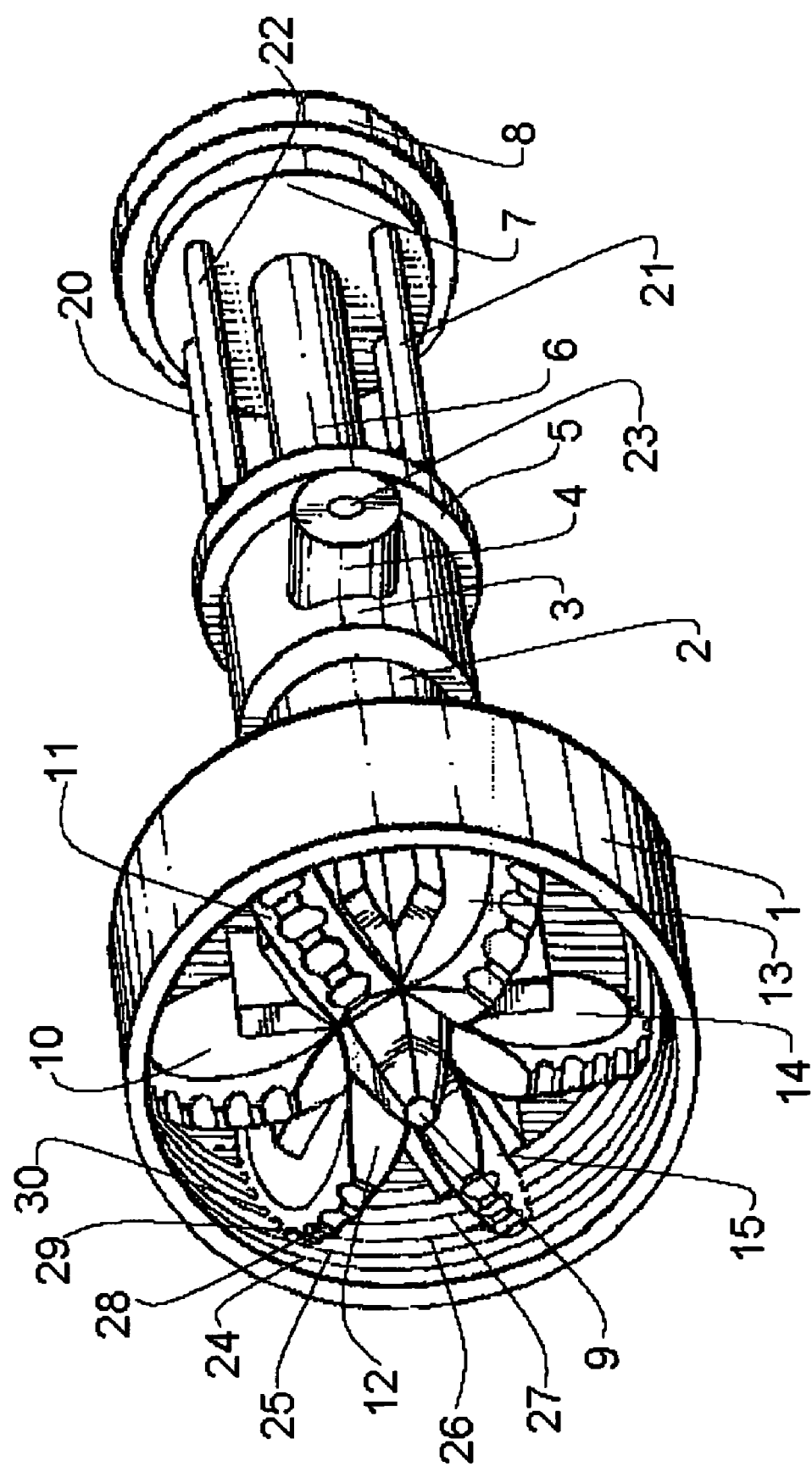
FIG. 1 is a front and side perspective view showing the extrusion mold, with a mold head that has six rotatable tapered cams surrounding a six-sided tapered mandrel that can be advanced in coordination with a gradual partial rotation of the tapered cams, for making hexagonal-sided tapered poles.
Figure 19:
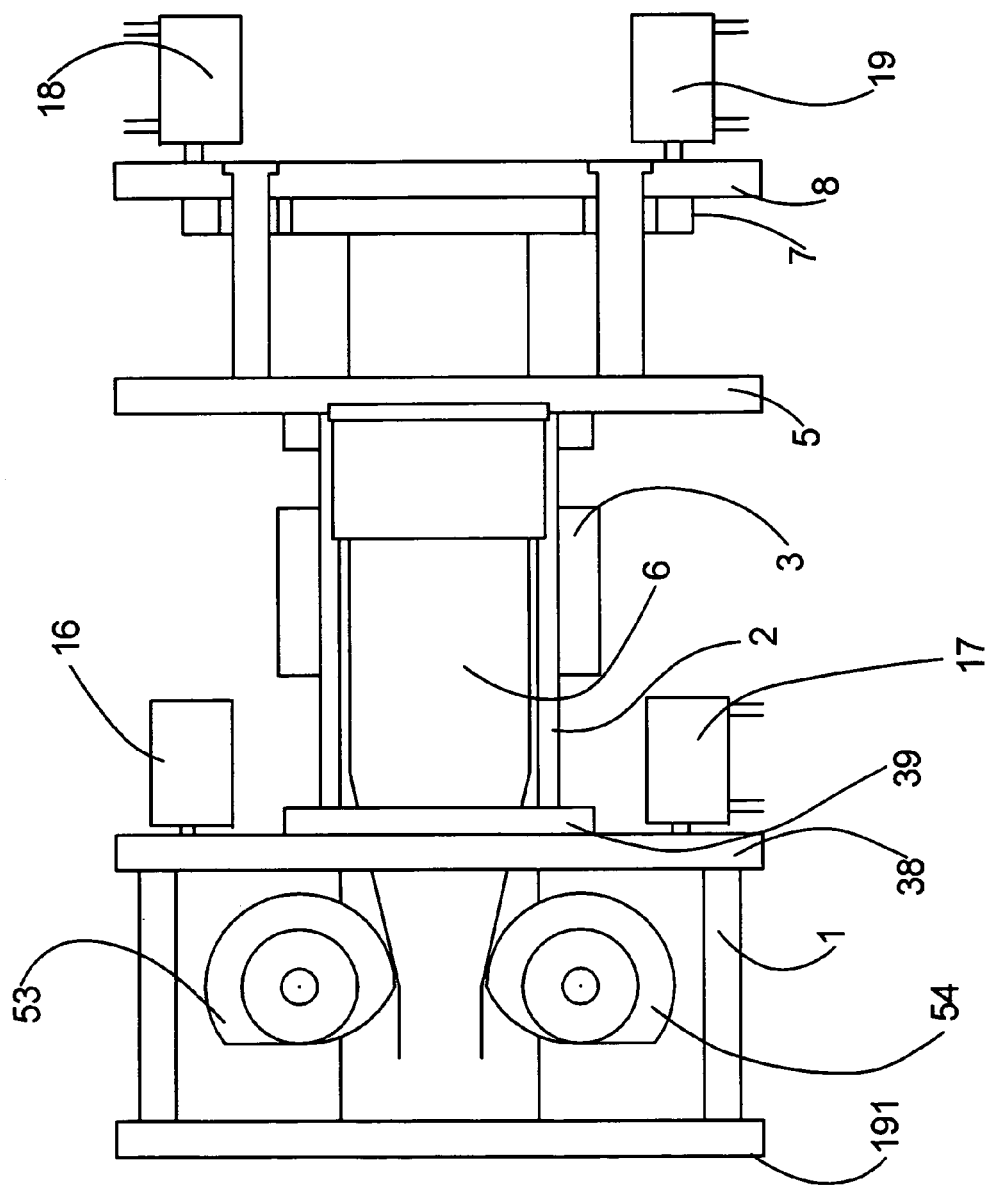
FIG. 19 shows a close-up side cross-sectional view of the extrusion mold in a narrow pole tip position.

Referring to FIG. 1, the main housing 1 contains the mold head which consists of a set of six moveable cams (10, 11, 12, 13, 14, & 15) which partially rotate on individual planes to define the upper bound of an extrusion aperture between the tip 9 of the moveable mandrel 6 and the cam faces. The cams are powered by gears 16 & 17 shown on FIG. 4 which cause the main housing to slide forward. The mandrel lies within the barrel 2, supported by the barrel ring 3, the mid plate 5, and the mandrel drive shaft which consists of posterior plate 7 and screws 20, 21, & 22. The horizontal motion of the mandrel 6 through the barrel 2 is powered by gears 18 & 19 shown on FIG. 4 on the back plate 8. As the mandrel 6 moves forward (left on the diagram) the inner bound of the extrusion aperture expands as the mandrel shown in FIG. 19 is narrower at its front end.

The mold head can be fitted with various dies for extruding poles of different shapes, with the outer mold cams and the inner mold tapered mandrel having complementary curvatures or facets. The outer mold cams have tapered, curved faces that enable the outer mold cams to abut along their respective edges at each rotational position of the cams.

The flanks on the cams are beveled to fine tolerance. The abutment of the edges of the cams is important to prevent leakage, and the extension of the flanks and solidity of the cams are important to provide strong backing and prevent distortion of the edges. The curved tapered cam faces are suitably coated with a hard smooth material such as chromium to allow the extruded material to slide easily over the cam faces. The outer mold cams are rotatably mounted on axles and their rotational position controlled by gears. The inner mold tapered mandrel or mandrel is positioned in the aperture formed by the outer mold cams to form a space through which will be extruded a wall of a hollow, tapering pole.

The central cylinder has a water pipe within to provide a cooling spray at the tip of the inner tapered mandrel. Fibreglass reinforcement rods are fed into the space between the sleeve and the inner tapered mandrel. The extruded product would emerge from the extrusion aperture. The cams of the outer mold head are rotated by teeth that fit within a cam sleeve's inner rings and grooves. The cam sleeve advances and retreats to control the cams' rotation in coordination with the advancement and retreat of the mandrel. The adjustable outer mold head drive mechanism is coordinated with an adjustable central cylinder advancement mechanism and with a sleeve advancement mechanism such that the inner tapered mandrel is advanced during extrusion at a rate that maintains the desired wall thickness or tapered wall thickness for the product between the inner tapered mandrel and the outer mold head cams at each point during the extrusion. The aperture as defined by the cams on the outer mold head gradually moves back and forth longitudinally within the housing and in contact with the sleeve head during the extrusion process.

Figure 2:
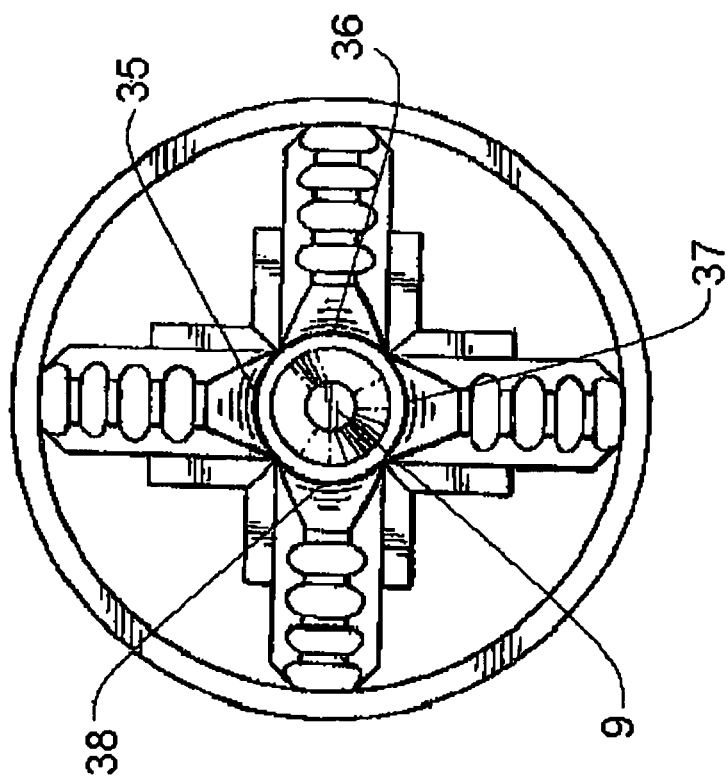
FIG. 2 is a front perspective showing the extrusion mold head with four rotatable tapered cams, each having a quarter-round molding face, for making round-circumference tapered poles.

Referring to FIG. 2, the detail of the mold head with the circular die is shown. The circular die is formed from 4 movable cams with four quarter-arc abutments as at 35, 36, 37, 38. Together they form a circular aperture around the mandrel tip 9. This enables the extrusion of circular poles. Aside from the shape of the poles to be extruded, the operation of the circular die version is identical to that of the hexagonal die version described below.

Figure 3:
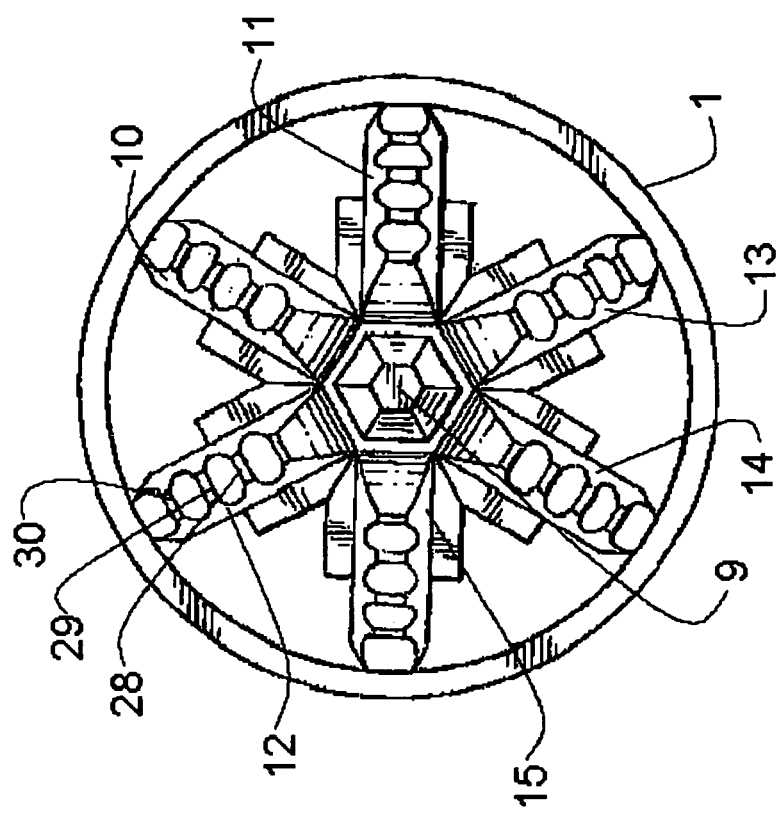
FIG. 3 is a front perspective of the extrusion mold head with six rotatable tapered cams surrounding a tapered mandrel that can be advanced during the extrusion, for making hexagonal-sided tapered poles.

In FIG. 3 the hexagonal tapered pole die is shown. Key features include the rings such as 24, 25, 26, 27 shown on FIG. 1 on which the teeth (i.e. 28, 29, 30) of the moving cams affix. As the main housing slides forward powered by gears 16 & 17 (FIG. 4), the rings push the teeth of the cams, forcing the cams to rotate inwards. The faces of the cams are tapered as shown in FIG. 5. As they rotate inwards the outer bound of the extrusion aperture decreases. Likewise the main housing 1 may also slide backwards causing the cams to rotate outwards to increase the extrusion aperture.

Figure 4:
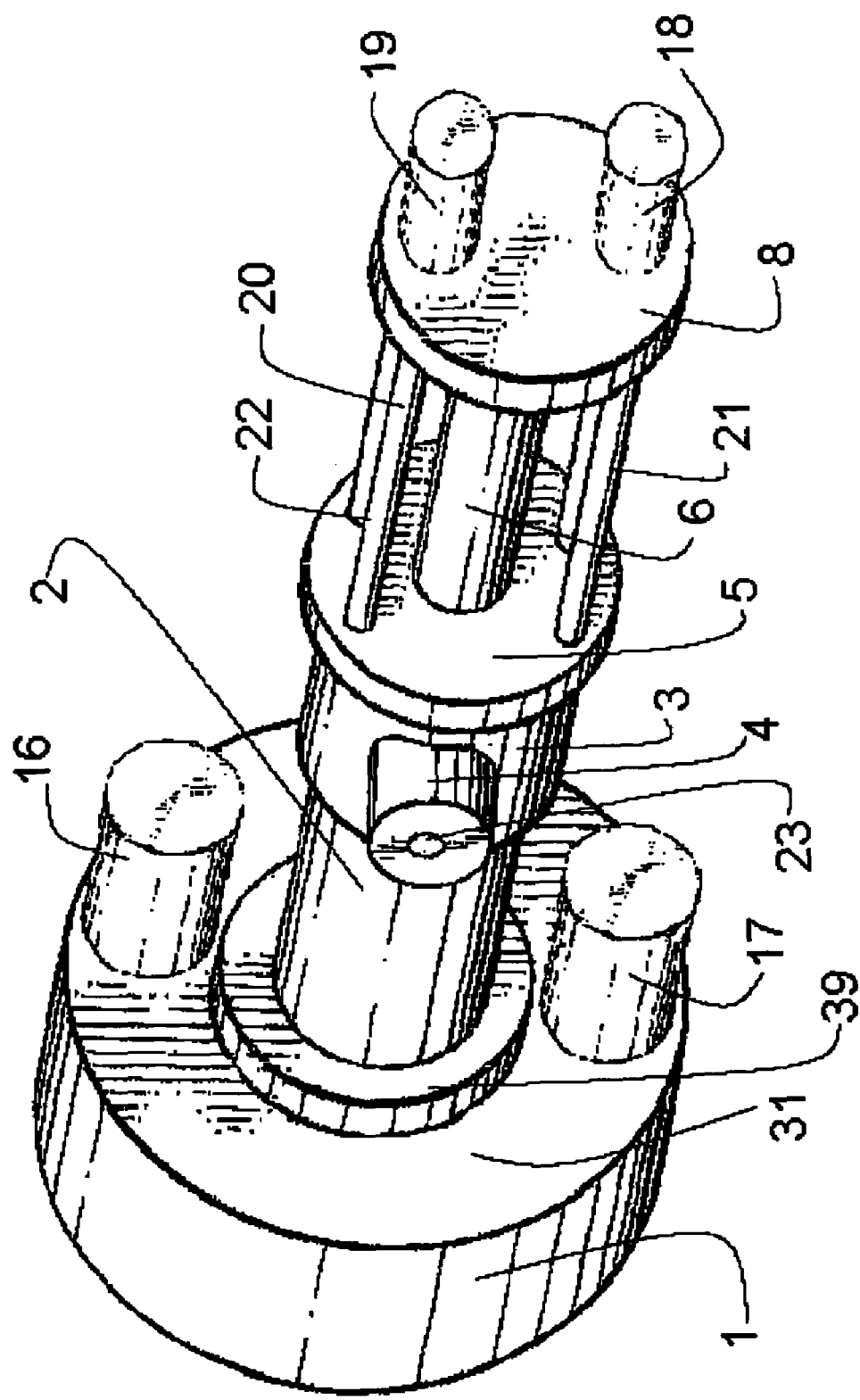
FIG. 4 is a rear side perspective of the extrusion mold.
Figure 5:
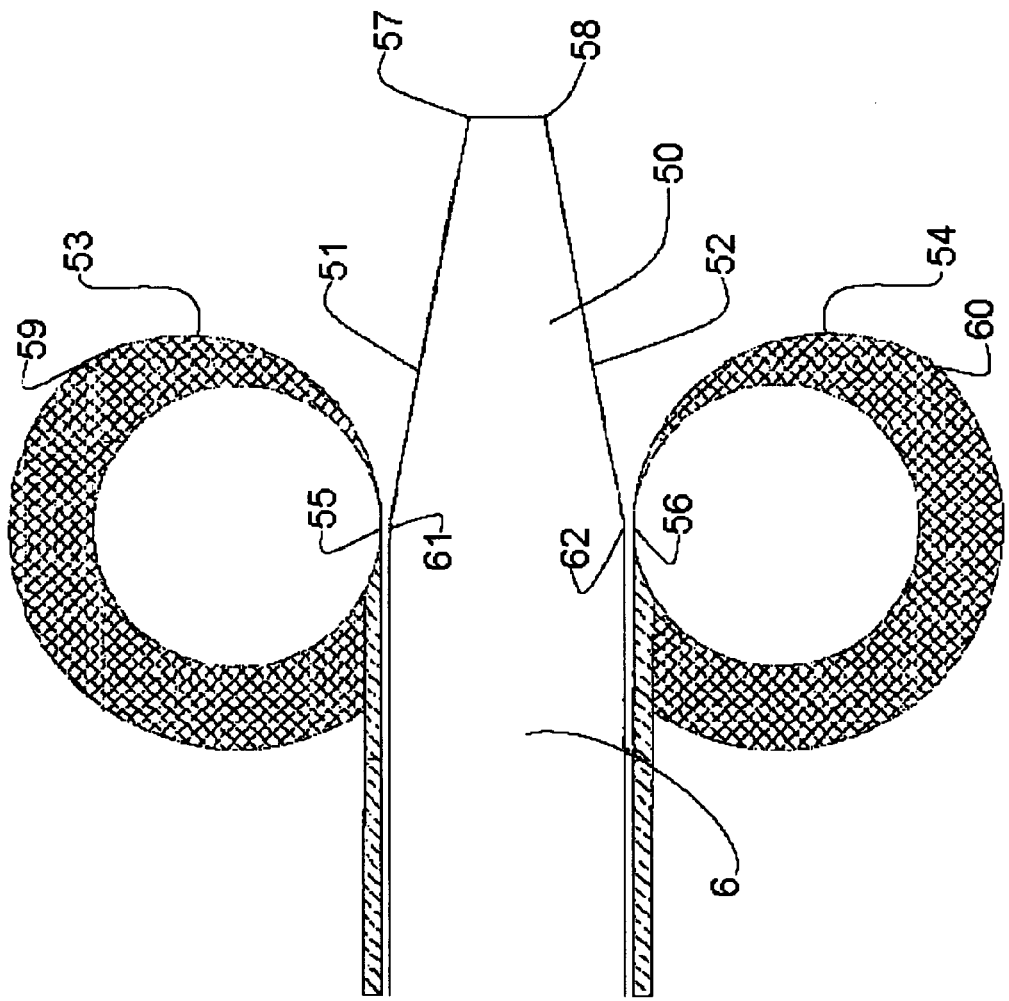
FIG. 5 is a side view illustrating showing a pair of rotatable tapered cams with a mandrel that can be advanced between them.

In FIG. 4, the device of FIG. 1 is shown from a rear side perspective. The back 31 of the main housing 1 connects to the barrel 2 via attaching plate 39. Liquid plastic enters the barrel 2 through the aperture 23 of the plastic inflow pipe 4 which is mounted on the ring 3 of the barrel 2.

FIG. 5 shows the curvature of the cams and extrusion aperture formed between the front section of the mandrel 6 and the movable cams 53 and 54. The front section of the mandrel 6, with its head tapered from point 61 to point 57 on the top and point 62 to point 58 on the bottom. The movable cams 53 and 54 are tapered so that their rotation changes the extrusion aperture. In this view the outer diameter is at its maximum between points 55 and 56. If the cam 53 was rotated clockwise, then this diameter would decrease until the portion of the tapered cam at point 59 (where maximal thickness is reached) occupied the position where point 55 is currently. Similarly cam 54 could be rotated counter-clockwise such that the portion of the cam at point 60 occupied the position of point 55. Currently the inner diameter is at its maximum between 61 and 62 on the mandrel which is at its outermost position. If the mandrel were slid back (left in diagram) the inner extrusion diameter would then be defined by the position on the tapered mandrel head 50 between the top 51 and the bottom 52. The minimum inner diameter would be reached when points 57 and 58 occupied the position that points 61 and 62 now occupy.

Figure 6:
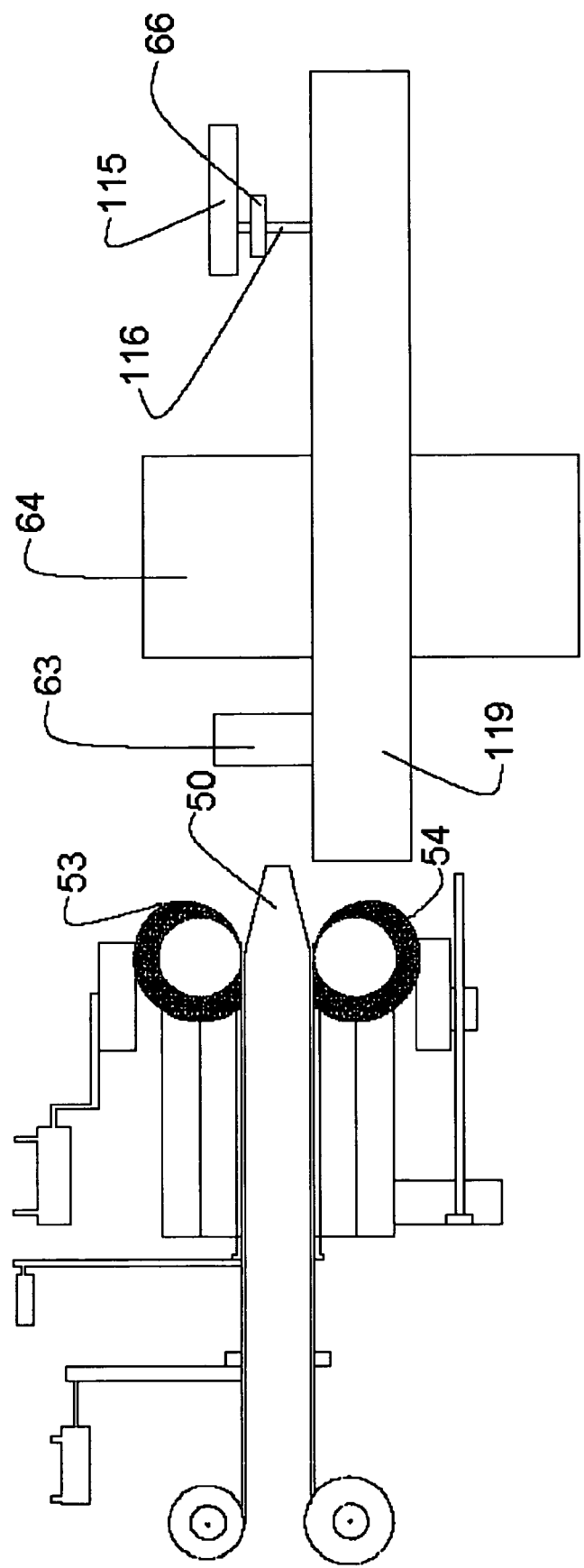
FIG. 6 is a side view illustrating the pair of rotatable tapered cams, with a mandrel that can be advanced between them, in an extrusion molding system.

FIG. 6 shows a detailed cross section of the extruder and related apparatus. The movable mold cams 53 and 54 are shown with tapered mandrel head 50 as in the previous diagram. Continuing right, there is a conveyor belt 119 which would carry the pole forward (rightward in diagram) as it is being extruded; a support 63 for the pole to be extruded; the support 64 for the conveyor belt 119, which may incorporate features to cool or treat the extruded portion of the poles; the pole bending apparatus consisting of adjustable tip bending post 116, tip-bending post head 115 and an optional fence 66 for bending the pole to the side.

Figure 7:
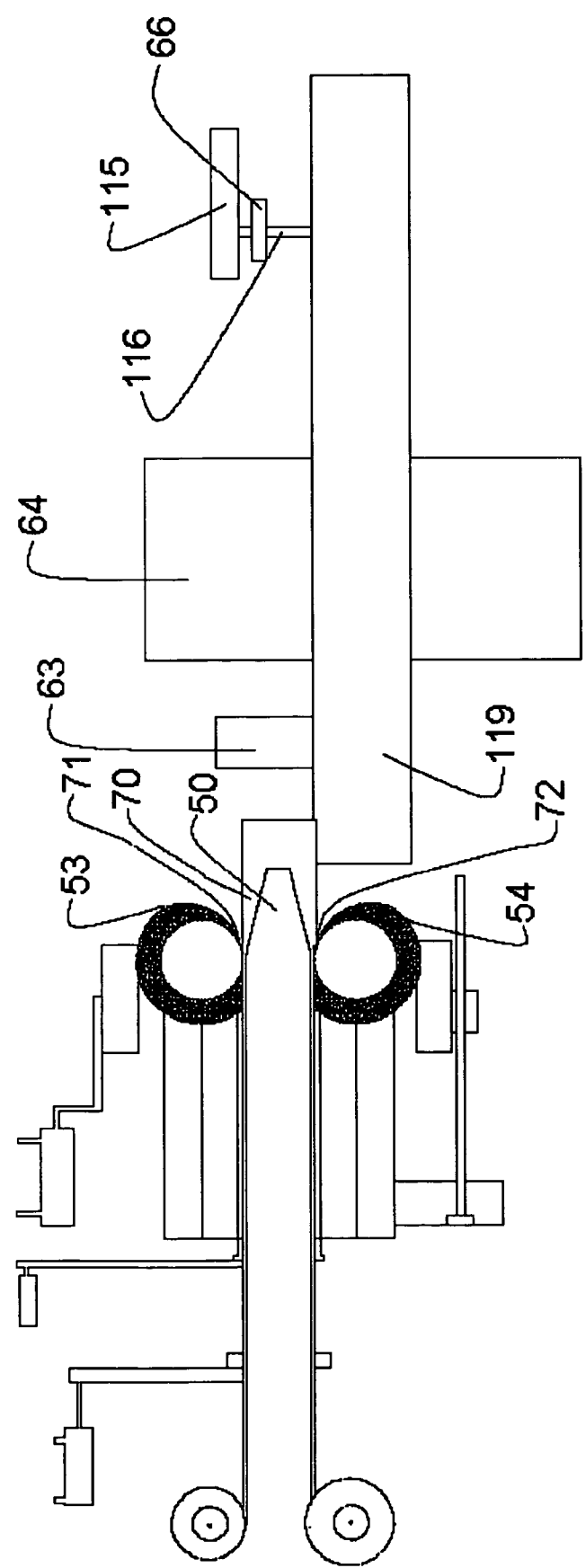
FIG. 7 shows the base of a tapered pole being extruded from the mold head.

FIGS. 7 to 9 form a series showing a pole being extruded. In FIG. 7 the wide end of the pole 70 is coming (rightward) out of the extruder. Note the positioning of cams 53 and 54 with the narrow part of the cam faces at 71 & 72 abutting the pole 70. The base for the extruded pole is formed with the cams rotated such that their thinner portions define the aperture for the extrusion. The diameter of the base will be corresponding wide. The inner mandrel is withdrawn toward the rear of the housing, in a position such that the thickness of the wall at the base is maximal.

In FIG. 8, the mid-section of the pole 70 is coming out of the extruder. Note the positioning of cams 53 and 54 with the middle width part of the cam faces at 81 & 82 abutting the pole 70. The coordinated gears have rotated the cams to a position where their medium thickness defines the extrusion aperture, causing a medium diameter for the mid-portion of the tapered pole. The coordinated gears have also caused the inner mandrel cylinder to be advanced such that a medium thickness on its tapered end causes a medium wall thickness.

In FIG. 9 the narrow end of the pole 70 is coming out of the extruder. Note the positioning of cams 53 and 54 with the maximum width part of the cam faces at 91 & 92 abutting the pole 70. The coordinated gears have rotated the cams to a position where their maximum thickness defines the extrusion aperture, causing a small diameter for the top of the first tapered pole. The coordinated gears have also caused the inner mandrel cylinder to be fully advanced such that a maximal thickness on its tapered end causes a minimal wall thickness.

FIG. 10 shows a series of round tapered poles being extruded. In FIG. 10 A, pole 109 has already passed through the mold head 1, shown in detail in FIG. 1. Pole 109 meets with pole 108 at pole-tip intersection 100. The extrusion is constant. There would have been a previously extruded pole at the base 105, of pole 109. In FIG. 10 B, pole 110 meets with pole 111 at pole-tip intersection 101. Pole 111 is broken at the far right edge 106. In FIG. 10 C, pole 112 meets with pole 113 at pole-base intersection 104. Pole 113 meets with pole 114 at pole-tip intersection 102. Pole 114 is angled upwards, having been pushed up by adjustable tip-bender 115, which is shown in FIG. 11. Pole 114 is broken off at 107. A reciprocal motion of the mold components efficiently makes a pair of poles for each back and forth cycle.

Referring to FIG. 11, a street lamp pole can be made with a bent top 117 in order to allow mounting along a street while a lamp suspending from the tip is bent overhead above the street. The bending can be done with a curved fence, a transverse puller, or a vertical pusher that is height adjustable, mounted in a conveyor as at 120, which is slidable in extruding platform 119, as the pole 118 is extruded. The bending can continue beyond the first bent pole to form a second bent pole in one cycle of the reciprocating inner mandrel cylinder and forward and backward rotation of the coordinated outer mold head cams. The conveyor may be designed to accommodate multiple tip-bending posts (such as 116). The tip-bending post 116 is topped by tip bender 115 which is simply a hemi-spherical surface that pushes upwards on the pole-tips when they are warm. When the pole tips cool, they solidify and can be cut or broken off. The tip-bending post 116 is adjustable in two ways: first, it can move vertically, its height adjusted by a screw 122; second, it can move horizontally with the conveyor 120.

Figure 12:
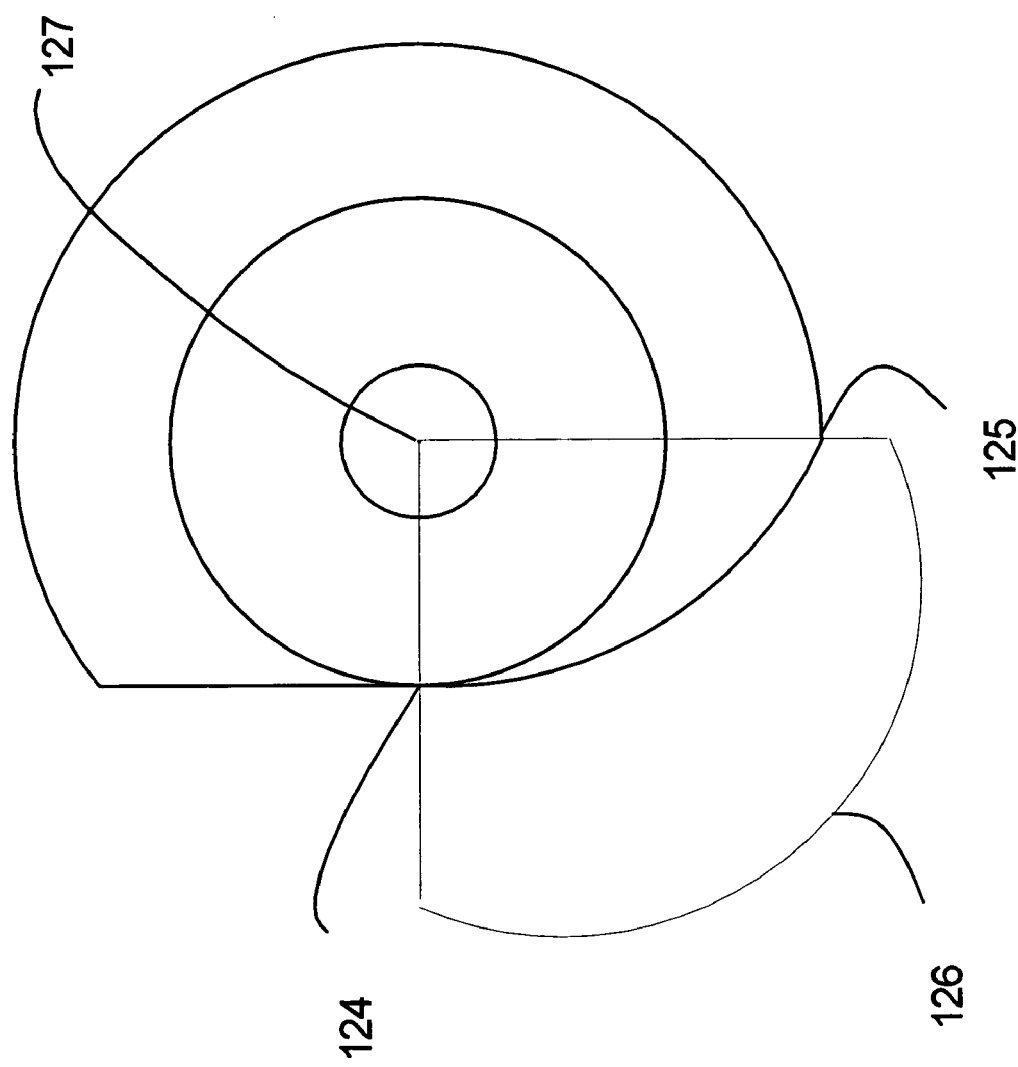
FIG. 12 shows the tapering on one of the rotatable cams.

FIG. 12 shows the details of the movable cam including the point of minimum diameter 124, the point of maximum diameter 125, the angle between them 126, and the axle 127 upon which the cams rotate.

Figure 13:
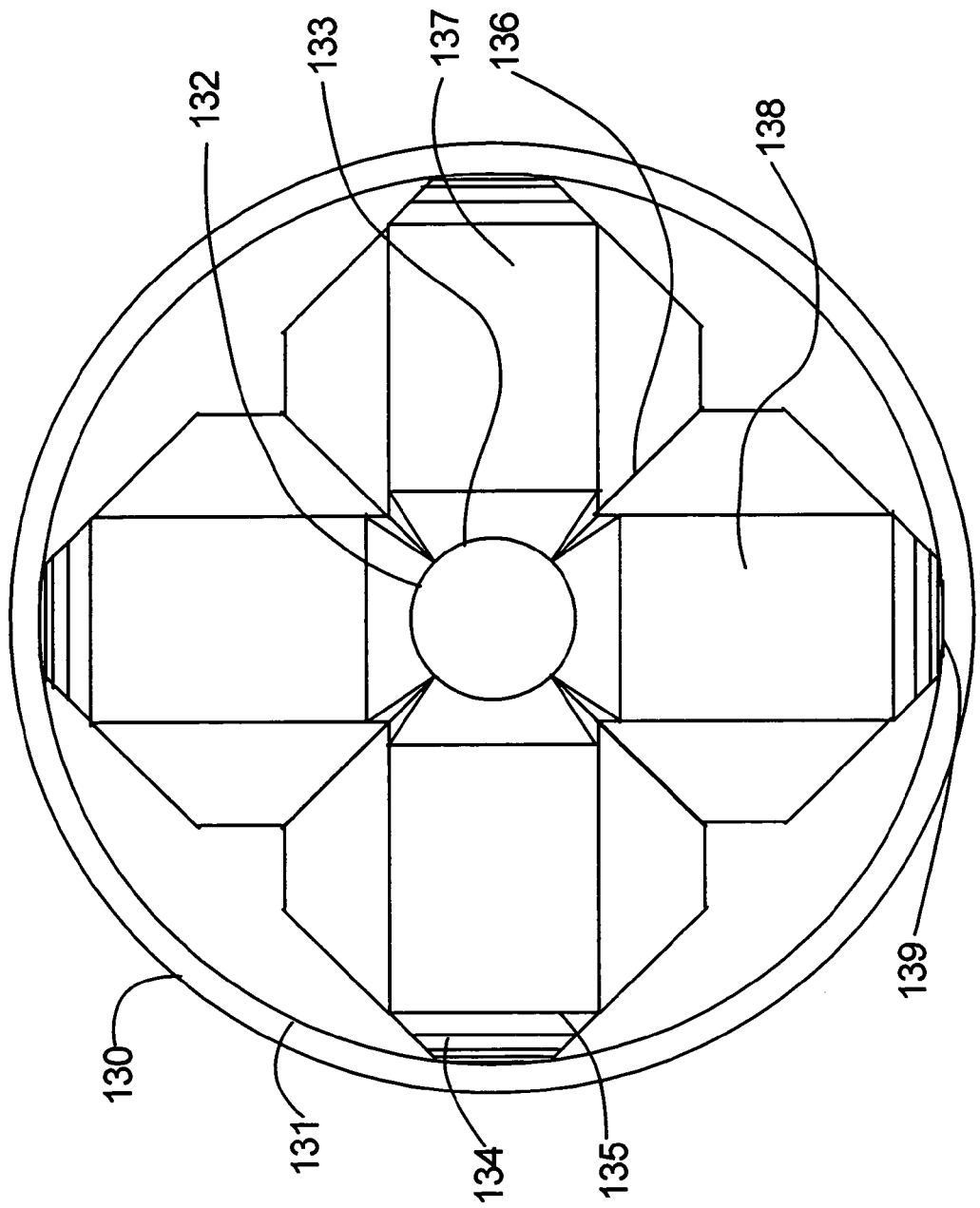
FIG. 13 is a front view of the round tapered pole mold face of FIG. 2.

FIG. 13 shows the same system features as FIG. 2, with the teeth rotated farther into the outer sleeve. The mold head consists of a series of rings such as 130 and 131 which hook into mold cam teeth such as 134, 135. For instance mold cam 138 hooks into one of the non-visible rings with its tooth 139. In this circle die version the mold cam faces are quarter arcs such as 132 and 133 which intersect to form a circular outer diameter for pole extrusion. The mold cams are placed adjacently to fill the die and their adjacent sides abut as do those of cams 137 and 138 at 136.

Figure 14:
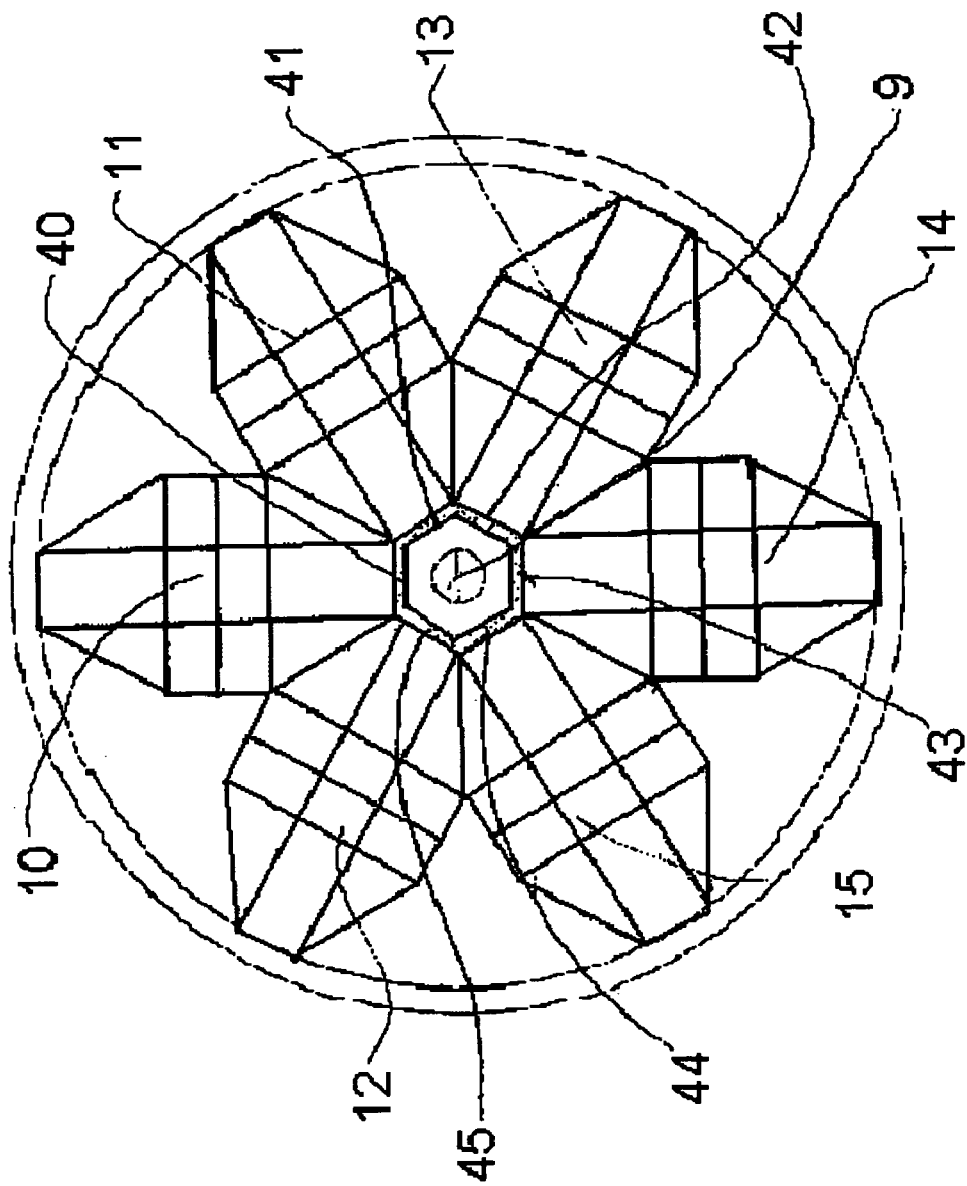
FIG. 14 is a front view of the hexagonal tapered pole mold face of FIG. 3.

FIG. 14 shows additional detail pursuant to the hexagonal die shown in FIG. 3. The faces 40, 41, 42, 43, 44, 45 of the mold cams 10, 11, 12, 13, 14, 15 create an extrusion aperture with a hexagonal outer diameter and a circular inner diameter at the mandrel tip 9.

Figure 15:
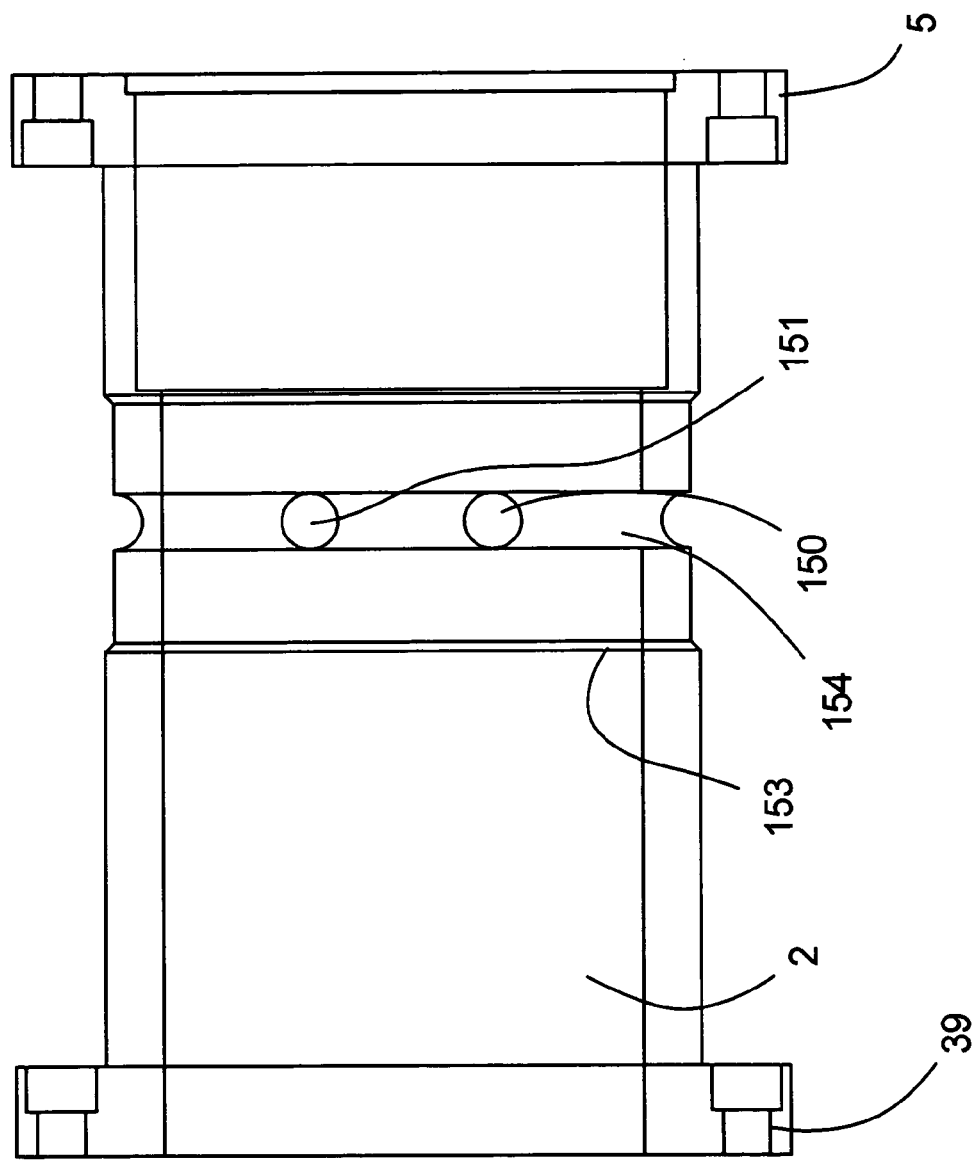
FIG. 15 is a side view of the injection barrel for the tapered pole extrusion mold.

In FIG. 15, the die barrel 2 is shown with attaching plate 39 which connects to the back 31 of the main housing 1 seen in FIG. 3. The side of the die barrel is indented at 153 where the ring shown in FIG. 16 attaches. A further indentation at 154 is where the plastic inflow pipe 4 (see FIG. 16) attaches. The attachments for the inflow pipe are at 150 and 151. These attach to 160 and 161 in FIG. 16. On the right the midplate 5 is shown.

Referring to FIG. 16, the ring 3 for the barrel 2 (see FIG. 1) is shown from two perspectives. On the left the cross section of the inflow pipe 23 is shown with attachments 162 and 163 which correspond to 160 and 161 respectively on the right side view diagram. The lateral attachments are shown also with 166 and 167 corresponding to 164 and 165 respectively. Extrusion material is fed into the mold through inlet 23, into the die barrel and from there to the extrusion ring between the cam faces and mandrel faces.

Figure 17:
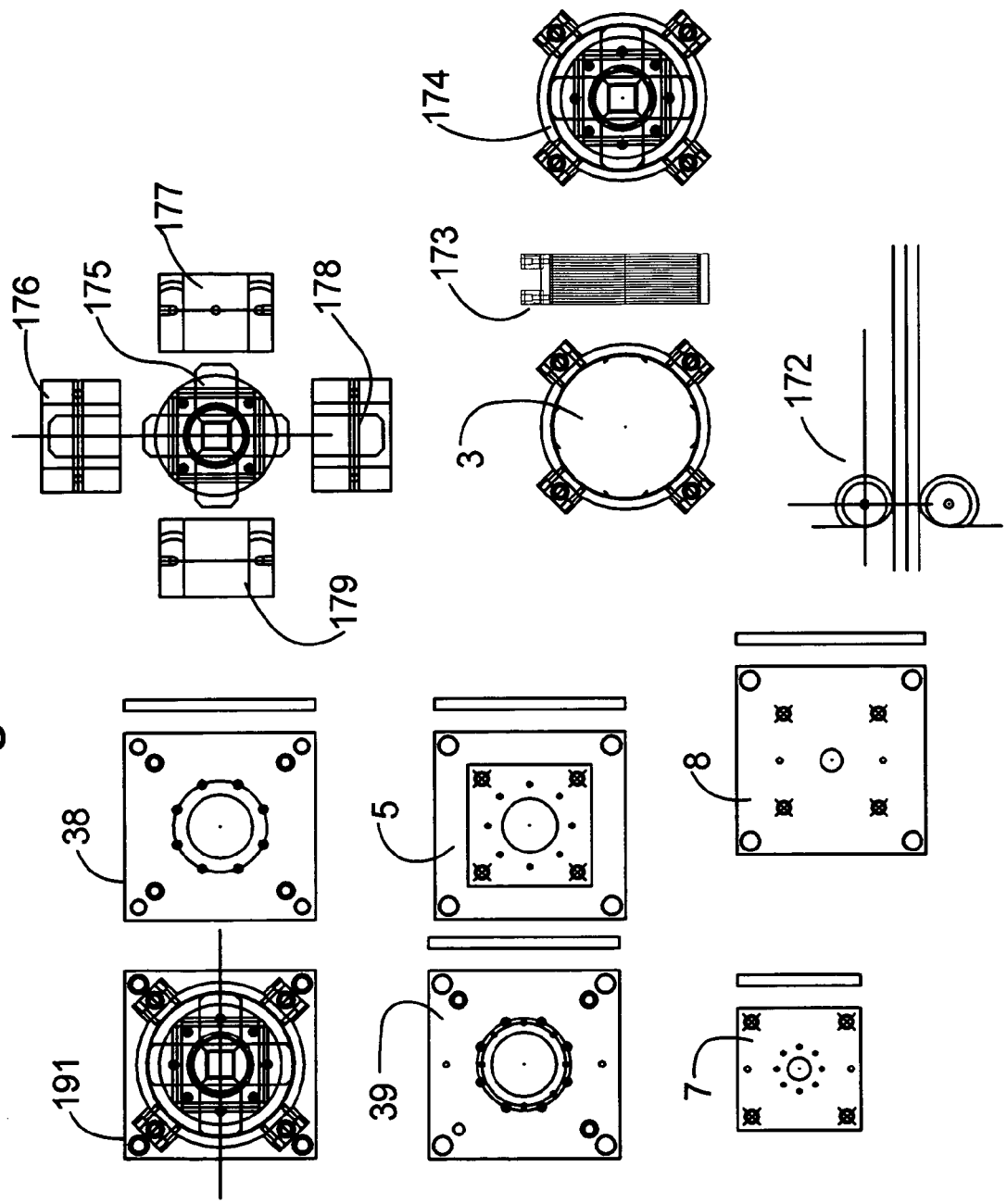
FIG. 17 shows plates for the joining portions of the tapered pole extrusion mold.

In FIG. 17, a machinist's diagram of the plates, the left side of the diagram shows front plate 191, back plate 38 of mold head 1, attaching plate 39 (connecting the barrel to the mold head), mid plate 5, posterior plate 7 (at the back of the barrel), and back plate 8 which supports the mandrel drive gears (18 and 19 in FIG. 19). The upper right of the diagram shows a square die 175 with cams from orthogonal views: 176 top-down view, 177 view from right side, 178 bottom-up view, 179 view from right side. Below we have the barrel ring 3, a side view of the ring 173, and the ring with a square die 174. At the bottom 172 the cams are shown abutting the barrel.

Figure 18:
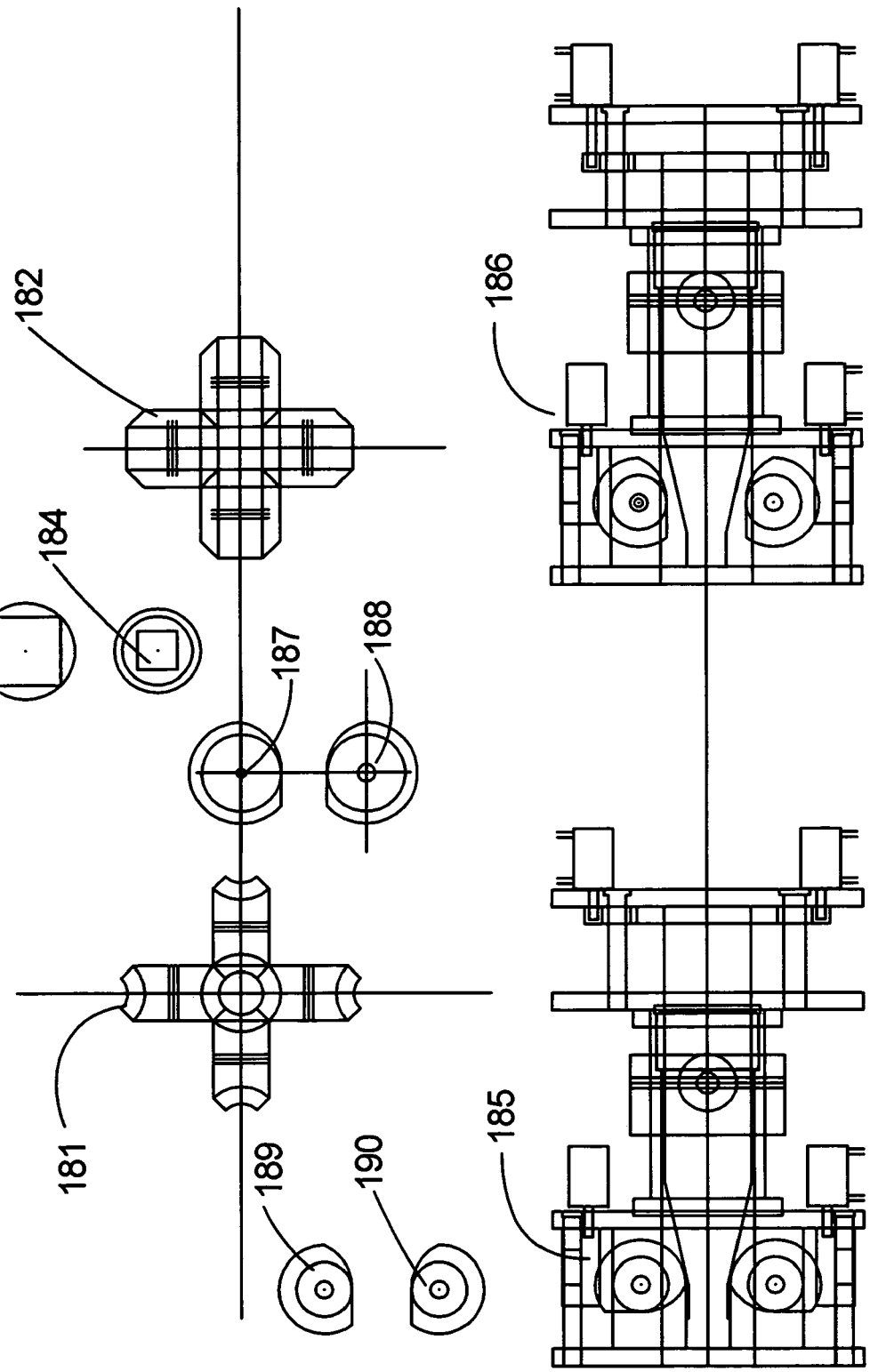
FIG. 18 shows side cross-sectional views of the extrusion mold in a narrow pole tip position (left) and in a wider pole base position (right), with rotating cam plates above.

Referring to FIG. 18, this view shows detail of how the extruder is assembled. In the upper left a circular die 181 is shown with corresponding cams 189 and 190 below. In the middle two more cams 187 and 188 are shown. On the upper right a square die 182 is shown with magnifications 183 and 184 of the center of the die. In the lower left a side translucent view 185 of the extruder is shown which corresponds to the FIG. 19 cross section. In the lower right a similar view 186 is shown with cams rotated and mandrel moved forward.

FIG. 19 shows the basic inner workings of the extruder. The front plate 191 caps the mold head 1 in which the cams 53 and 54 are positioned relative to the mandrel 6 so as to extrude the small end of a pole. The back 31 of the mold head 1 support gears 16 and 17 which power the cams. Attaching plate 39 attaches the barrel 2 to the back plate 38 of the mold head 1 and provides additional support for the barrel. The barrel 2 is bound with ring 3 (also shown in FIG. 16). The mid plate 5 supports the barrel. The posterior plate 7 supports the base of the mandrel and guides it forward. The gears 18 and 19 which propel the mandrel forwards and backwards are located on the back plate 8.

The outer mold head cam control gear and the inner tapered mandrel control gear can be machined and set up with the master gear mechanism to control a pre-determined outer taper for a pole as well as a pre-determined taper for the cylindrical wall of the pole. Alternative, the taper can be programmed with computer control of the extrusion rate, the outer mold cam rotation rate, and the inner tapered mandrel advancement rate all calculated and coordinated to produce an outer taper and a wall taper as designed.

Optionally sensors can be installed to give feedback on the actual pole diameter and on the pole's wall thickness during extrusion and compared to the position of those measurements with respect to the length of the pole. The feedback can be used to make fine adjustments to the material flow and extrusion rate, or to the outer mold head cam rotation and to the inner tapered mandrel advancement to achieve the desired pole. This can be done on a test extrusion for a particular kind of extrudable material composition and shape of pole desired prior to production of a set of such poles. The feedback can also continue on a fine-tuning basis during the production run to keep individual poles within a range of tolerance for their external diameter and internal diameter as they are being extruded.

The within described invention may be embodied in other specific forms and with additional options and accessories without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalence of the claims are therefore intended to be embraced therein.

The invention claimed is:

1. A tapered hollow pole extruder comprising:
   a) an extrusion mold housing with a plastic material supply inlet;
   b) a mold bead comprising:
      i) a cylindrical cam sleeve comprising a plurality of circumferential grooves on the inner surface of said cylindrical cam sleeve;
      ii) coordinated arms that are rotatable within the mold head and that define a periphery of an extrusion aperture, wherein each of said coordinated arms comprises a plurality of teeth that are adapted to engage said circumferential grooves; and
      iii) a tapered mandrel that is moveable within the mold head and defines a blockage in a central portion of the extrusion aperture;
   in which movement of said cylindrical cam sleeve along its longitudinal axis effects rotation of the coordinated arms, and the periphery of the aperture varies in size depending on rotation of the coordinated arms within the mold head, and the blockage of the central portion of the aperture varies in size depending on the movement of the tapered mandrel within the mold head.

2. The tapered hollow pole extruder of claim 1, in which the movement of the cylindrical cam sleeve and the movement of the tapered mandrel are coordinated to make the blockage of the central portion of the extrusion aperture increase and decrease in size in concert with a respective increase and decrease in size of the periphery of the extrusion aperture during an extrusion.

3. The tapered hollow pole extruder of claim 1, in which the tapered mandrel is elongated and is mounted along a longitudinal axis centered on and perpendicular to the extrusion aperture.

4. The tapered hollow pole extruder of claim 1, in which the tapered mandrel comprises a set of mandrel facets that are narrower toward a tip of the tapered mandrel.

5. The tapered hollow pole extruder of claim 1, in which the coordinated arms comprise a set of arm facets that are variable in their exposed width and define the periphery of the extrusion aperture during an extrusion.

6. The tapered hollow pole extruder of claim 4, in which
   a) the coordinated arms comprise a set of arm facets that are variable in their exposed width and define the periphery of the extrusion aperture during an extrusion;
   b) the set of arm facets matches the set of mandrel facets in number and
   c) the arm facets and the mandrel facets are parallel to each other during an extrusion.

7. The tapered hollow pole extruder of claim 6, in which a position of the coordinated arms in relation to a position of the tapered mandrel defines a distance between the corresponding arm facets and mandrel facets and controls a wall thickness for a tapered hollow pole dining an extrusion.

8. The tapered hollow pole extruder of claim 7, in which a gradually adjustable position of the coordinated arms in relation to a gradually adjustable position of the tapered mandrel defines a variable distance between corresponding arm facets and mandrel facets and enables a wall thickness that is thinner at a top portion and thicker at a base portion of a tapered hollow pole during an extrusion.

9. The tapered hollow pole extruder of claim 1, in which the coordinated arms are a set of partially rotatable tapered cams.

10. The tapered hollow pole extruder of claim 1, in which a rear portion of the mandrel is mounted on slide rods attached longitudinal to the mold housing to enable the mandrel to be moved longitudinally within the mold housing.

11. The tapered hollow pole extruder of claim 10, in which screw bolts are threaded through a base flange on the tapered mandrel and are driven by a screw gear to adjust advancement of the tapered mandrel and the degree to which the mandrel partially blocks a central portion of the extrusion aperture during an extrusion.

12. The tapered hollow pole extruder of claim 11, in which the screw gear is driven by a screw gear electric motor.

13. The tapered hollow pole extruder of claim 12, in which the screw gear electric motor is computer controlled to provide a gradual advancement of the tapered mandrel and the degree to which the tapered mandrel partially blocks a central portion of the extrusion aperture during an extrusion in keeping with design parameters for a tapered hollow pole.

14. The tapered hollow pole extruder of claim 13, in which a coordinated arm control gear and a mandrel control gear are interconnected and are simultaneously adjustable to provide for a selectable varying wall thickness of a tapered hollow pole during extrusion.

15. The tapered hollow pole extruder of claim 1, in which mandrel positioning gears advance the tapered mandrel simultaneously with coordinated arm positioning gears widening the extrusion aperture during an extrusion of a tapered hollow pole from tip to base, and a reverse motion of the mandrel positioning gears simultaneous with a reverse motion of the coordinated arm positioning gears provides for a reciprocal extrusion of a tapered hollow pole from base to tip.

16. The tapered hollow pole extruder of claim 1, in which a pole bender applies lateral pressure to an extruded portion of a pole as it cools.

17. The tapered hollow pole extruder of claim 1, in which computer modules control a changing position of the coordinated arms and a changing position of the tapered mandrel during an extrusion to provide for an outer overall taper of a pole and an inner taper of wall thickness for the pole.

18. The tapered hollow pole extruder of claim 2, in which:
   a) the tapered mandrel is elongated and is mounted along a longitudinal axis centered on and perpendicular to the extrusion aperture;
   b) the tapered mandrel comprises a set of mandrel facets that are narrower toward a tip of the tapered mandrel;
   c) the coordinated arms comprise a set of arm facets that are variable in their exposed width and define the periphery of the extrusion aperture during an extrusion;
   d) the set of arm facets matches the set of mandrel facets in number;
   e) the arm facets and the mandrel facets are parallel to each other during an extrusion and
   f) a position of the coordinated arms in relation to a position of the tapered mandrel defines a distance between the corresponding arm facets and mandrel facets and controls a wall thickness for a tapered hollow pole during an extrusion.

19. The tapered hollow pole extruder of claim 18, in which a gradually adjustable position of the coordinated arms in relation to a gradually adjustable position of the tapered mandrel defines a variable distance between corresponding arm facets and mandrel facets and enables a wall thickness that is thinner at a top portion and thicker at a base portion of a tapered hollow pole during an extrusion.

20. The tapered hollow pole extruder of claim 2, in which
   a) a rear portion of the mandrel is mounted on slide rods attached longitudinal to the mold housing to enable the mandrel to be moved longitudinally within the mold housing;
   b) screw bolts are threaded through a base flange on the tapered mandrel and are driven by a screw gear to adjust advancement of the tapered mandrel and the degree to which the mandrel partially blocks a central portion of the extrusion aperture during an extrusion;
   c) the screw gear is driven by a screw gear electric motor.

21. The tapered hollow pole extruder of claim 20, in which the screw gear electric motor is computer controlled to provide a gradual advancement of the tapered mandrel and the degree to the tapered mandrel partially blocks a central portion of the extrusion aperture during an extrusion in keeping with design parameters for a tapered hollow pole.

22. The tapered hollow pole extruder of claim 1, in which:
   a) a coordinated arm control gear and a mandrel control gear are interconnected and are simultaneously adjustable to provide for a selectable varying wall thickness of a tapered hollow pole during extrusion; and
   b) mandrel positioning gears advance the tapered mandrel simultaneously with coordinated arm positioning gears widening the extrusion aperture during an extrusion of a tapered hollow pole from tip to base, and a reverse motion of the mandrel positioning gears simultaneous with a reverse motion of the coordinated arm positioning gears provides for a reciprocal extrusion of a tapered hollow pole from base to tip.

23. The tapered hollow pole extruder of claim 22, in which computer modules control a changing position of the coordinated arms and a changing position of the tapered mandrel during an extrusion to provide for an outer overall taper of a pole and an inner taper of wall thickness for the pole.

24. A tapered hollow pole extruder comprising:
   a) an extrusion mold housing;
   b) a earn housing comprising an attachment surface on the inner surface of said cam housing;
   c) coordinated arms that are rotatable within the cam housing and that define a periphery of an extrusion aperture, wherein each of said coordinated arms comprise an engagement surface tat is adapted to engage said attachment surface; and
   d) a tapered mandrel that is moveable within the cam housing and defines a blockage in a central portion of the extrusion aperture;
   in which lateral movement of said cam housing effects rotation of the coordinated arms, and the periphery of the aperture varies in size depending on the rotation of the coordinated arms within the, cam housing, and the blockage of the central portion of the aperture varies in size depending on the movement of the tapered mandrel within the cam housing.

\* \* \* \* \*